United States Patent
Hagel et al.

(10) Patent No.: US 8,935,041 B2
(45) Date of Patent: Jan. 13, 2015

(54) DIAGNOSTIC METHOD FOR A TORSIONAL DAMPER IN A DRIVE TRAIN OF A VEHICLE

(75) Inventors: Reinhold Hagel, Pinzberg (DE); Mehmet Tuna, Fürth (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/877,089

(22) PCT Filed: Sep. 28, 2011

(86) PCT No.: PCT/EP2011/066925
§ 371 (c)(1),
(2), (4) Date: Mar. 29, 2013

(87) PCT Pub. No.: WO2012/041928
PCT Pub. Date: Apr. 5, 2012

(65) Prior Publication Data
US 2013/0197740 A1    Aug. 1, 2013

(30) Foreign Application Priority Data
Oct. 1, 2010 (DE) .......................... 10 2010 041 889

(51) Int. Cl.
*G01M 13/02*    (2006.01)
*F16F 15/00*    (2006.01)
(Continued)

(52) U.S. Cl.
CPC ........... *G01M 13/028* (2013.01); *F16F 15/002* (2013.01); *F16F 15/10* (2013.01); *G01H 1/003* (2013.01); *G01H 1/10* (2013.01)
USPC ........ 701/32.1; 701/33.7; 701/34.1; 701/34.4

(58) Field of Classification Search
CPC .............................. G01M 13/028; G01H 1/10
USPC ............................... 701/32.1, 33.7, 34.1, 34.4
See application file for complete search history.

(56) References Cited

U.S. PATENT DOCUMENTS 1,815,807 A    7/1931    Stamm et al. ................. 74/574.2
5,996,395 A  * 12/1999   Nagasawa et al. ................... 73/9

FOREIGN PATENT DOCUMENTS

DE         19545008 A1 *  6/1997 ............. B23Q 17/09
DE       102008027174 A1   1/2009 ............. G01M 15/00
(Continued)

OTHER PUBLICATIONS

German Office Action, Application No. 102010041889.7, 6 pages, Jul. 11, 2011.
(Continued)

*Primary Examiner* — Mary Cheung
*Assistant Examiner* — Brian P Sweeney
(74) *Attorney, Agent, or Firm* — King & Spalding L.L.P.

(57) ABSTRACT

A diagnostic method for a torsional vibration damper in a drive train of a vehicle may include the steps of providing a drive train having a drive unit (e.g., an internal combustion engine) for generating a driving torque, a drive shaft (e.g., a crankshaft) coupled to the drive unit for transmitting the driving torque to an output shaft, and a torsional vibration damper connected to the drive shaft for damping torsional vibrations of the drive shaft, capturing a reference vibration signal of the drive shaft in a reference state, capturing an operating vibration signal of the drive shaft in an operating state deviating from the reference state, and comparing the reference vibration signal to the operating vibration signal.

12 Claims, 4 Drawing Sheets

(51) Int. Cl.
*F16F 15/10* (2006.01)
*G01H 1/00* (2006.01)
*G01H 1/10* (2006.01)

(56) References Cited

FOREIGN PATENT DOCUMENTS

| DE | 2009 000 088 A1 | * | 7/2010 | F02D 41/00 |
|---|---|---|---|---|
| DE | 102009000088 A1 | | 7/2010 | F02D 41/00 |
| JP | 59094018 A | | 5/1984 | G01H 1/00 |
| JP | 5087695 A | | 4/1993 | G01M 17/00 |
| JP | 5087697 A | | 4/1993 | G01M 17/00 |
| JP | 5322706 A | | 12/1993 | G01M 13/02 |
| JP | 2005 247234 A | * | 9/2005 | B60K 41/00 |
| JP | 2005247234 A | | 9/2005 | B60W 10/00 |
| WO | 01/65109 A1 | | 9/2001 | F02N 11/04 |
| WO | 2004/040251 A1 | | 5/2004 | G01J 3/00 |
| WO | 2012/041928 A1 | | 4/2012 | F16F 15/00 |

OTHER PUBLICATIONS

International Search Report and Written Opinion, Application No. PCT/EP2011/066925, 14 pages, Jan. 25, 2012.

* cited by examiner

US 8,935,041 B2

DIAGNOSTIC METHOD FOR A TORSIONAL DAMPER IN A DRIVE TRAIN OF A VEHICLE

CROSS-REFERENCE TO RELATED APPLICATIONS

This application is a U.S. National Stage Application of International Application No. PCT/EP2011/066925 filed Sep. 28, 2011, which designates the United States of America, and claims priority to DE Application No. 10 2010 041 889.7 filed Oct. 1, 2010, the contents of which are hereby incorporated by reference in their entirety.

TECHNICAL FIELD

The disclosure relates to a diagnostic method for a torsional damper in a drive train of a vehicle.

BACKGROUND

Internal combustion engines usually have a torsional vibration damper, referred to below as torsional vibration damper, at a free end of a drive shaft in the form of a crank shaft. The torsional damper serves to reduce undesired torsional vibrations of the drive shaft. Failure of the torsional damper can lead to destruction of the drive shaft. Torsional dampers therefore serve to pick up torsional vibration energy of the drive train and therefore of the drive shaft. Owing to continuous stressing of the torsional damper, faults can occur which can adversely affect the damping behavior of the torsional damper. The specified faults can occur either abruptly or gradually during the service life of the torsional damper.

SUMMARY

One embodiment provides a diagnostic method for a torsional damper in a drive train of a vehicle, comprising (a) providing a drive train comprising: (i) a drive, e.g., an internal combustion engine, for generating a drive torque, (ii) a drive shaft, e.g., a crank shaft, which is coupled to the drive and has the purpose of transmitting the drive torque to an output shaft, and (iii) a torsional damper which is connected to the drive shaft and has the purpose of damping torsional vibrations of the drive shaft, (b) acquiring a reference vibration signal of the drive shaft in a reference state, (c) acquiring an operating vibration signal of the drive shaft in an operating state which deviates from the reference state, and (d) comparing the reference vibration signal with the operating vibration signal.

In a further embodiment, the vibration signals are the rotational speed signals of the drive shaft.

In a further embodiment, the method comprises, before the comparison of the reference vibration signal with the operating vibration signal, transforming the vibration signals into a frequency range for extracting the amplitude of at least one engine order of the drive shaft.

In a further embodiment, the method comprises comparing the amplitudes of the extracted engine order.

In a further embodiment, the method comprises calculating a weighted amplitude sum value of various extracted engine orders as a reference amplitude value.

In a further embodiment, the method comprises assigning a new state of the drive shaft as a reference state.

In a further embodiment, the method comprises performing the comparison of the amplitudes by forming an amplitude difference as a difference between the reference amplitude and the operating amplitude.

In a further embodiment, the method comprises evaluating the amplitude difference.

In a further embodiment, the method comprises performing an exchange of the torsional damper in response to a predefinable tolerance range for the amplitude difference being exceeded.

In a further embodiment, the method comprises determining a plurality of reference vibration signals as a function of a drive setpoint rotational speed.

In a further embodiment, the method comprises averaging a plurality of reference values for a selected drive setpoint rotational speed and a selected engine order.

In a further embodiment, the method comprises accounting for a trend compensation in the determination of the reference vibration signal.

In a further embodiment, the method comprises arranging the torsional damper at a free end of the drive shaft.

In a further embodiment, the method comprises performing the acquisition of at least one of the vibration signals in an overrun mode.

In a further embodiment, the method comprises compensating torsional vibrations of the drive shaft using a flywheel mounted at a fixed end of the drive shaft as an energy accumulator.

BRIEF DESCRIPTION OF THE DRAWINGS

Exemplary embodiments will be explained in more detail below based on the schematic drawings, wherein.

DETAILED DESCRIPTION

Figure 1:
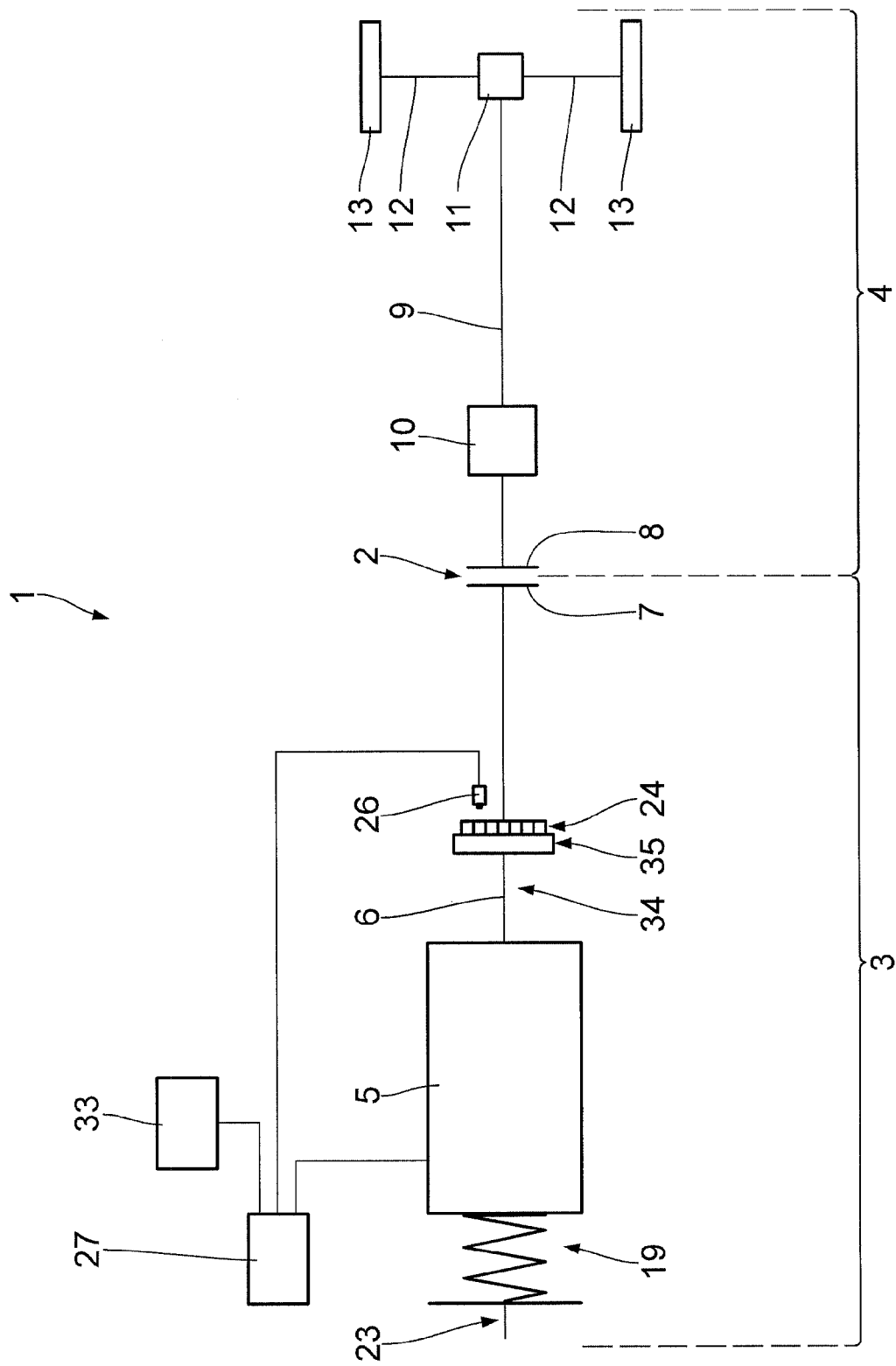
FIG. 1 shows a schematic illustration of a drive train of a motor vehicle having a torsional damper.

Embodiments of the present disclosure provide a method for diagnosing a torsional damper which permits reliable monitoring of the torsional damper with little expenditure.

For example, is some embodiments a diagnosis of a torsional damper can be carried out by permitting a comparison of the reference vibration signal with the operating vibration signal a diagnosis of the torsional damper on the basis of an acquired reference vibration signal of a drive shaft in a reference state and an acquired operating vibration signal of the drive shaft in an operating state which deviates from the reference state. For this purpose a drive train is provided with a drive for generating a drive torque, wherein the drive can be embodied as an internal combustion engine. Furthermore, the drive train comprises the drive shaft which is coupled to the drive and has the purpose of transmitting the drive torque to an output shaft. The drive shaft can be embodied as a crank shaft. In addition, the drive train comprises the torsional damper which is connected to the drive shaft and has the purpose of damping torsional vibrations of the drive shaft.

In a further embodiment, a rotational speed signal of the drive shaft is used as a vibration signal in the reference state and in the operating state, which may permit direct monitoring of the vibration behavior of the drive shaft. Changing the vibration behavior of the drive shaft acts directly on the rotational speed signal. The reason for this is that the damping behavior of the torsional damper and therefore the vibration behavior of the drive shaft is determined substantially by the moment of inertia of the torsional damper. A fault which occurs in the torsional damper therefore brings about a change in the mechanical parameters of the drive shaft at the seat of the torsional damper, with the result that the changes in the mechanical parameters influence the vibration behavior of the drive shaft and therefore of the drive train.

In a further embodiment, before the comparison of the reference vibration signal with the operating vibration signal, the vibration signals are transformed into a frequency range for extracting the amplitude of at least one engine order of the drive shaft. This may permit efficient acquisition of information by evaluating the transformed rotational speed signals in the frequency domain. This makes it possible to extract the amplitude of at least one engine order of the drive shaft. This has proven particularly expedient, in particular, to evaluate low engine orders, i.e. orders less than the ignition order. The selection of the $1.5^{th}$ engine order reacts particularly sensitively to changes of parameters of the torsional damper, for example in a series-mounted six cylinder engine, and is therefore particularly suitable for analysis of the transformed vibration signals.

In a further embodiment, the amplitudes of the extracted engine order are compared. This may permit direct, reliable and low-cost diagnosis of the torsional damper. The amplitude signals of the extracted engine order of the drive shaft can be evaluated directly during a frequency analysis.

In a further embodiment, a weighted amplitude sum value of various extracted engine orders is calculated as a reference amplitude value. This may permit a reference characteristic value to be provided with improved sensitivity, with the result that small deviations in the vibration behavior of the drive shaft, and therefore faults of the torsional damper, are already detected early.

In a further embodiment, a new state of the drive shaft is used as a reference state, which may permit an unfalsified, original vibration behavior of the drive shaft to be determined.

In a further embodiment, the comparison of the amplitudes is performed by forming an amplitude difference as a difference between the reference amplitude and the operating amplitude. In this manner, the amplitude values may be compared with one another directly and at low cost. Such a comparison can be carried out in a control unit which is present in a motor vehicle in any case, with the result that additional monitoring/closed-loop control units are not necessary for the disclosed method.

In a further embodiment, the amplitude difference is evaluated, which may permit conclusions to be drawn about the vibration behavior of the drive shaft and therefore about the damping behavior of the torsional damper.

In a further embodiment, an exchange of the torsional damper is performed in response to a predefinable tolerance range for the amplitude difference being exceeded. This may signal in good time a warning about a possible, expected failure of the torsional damper owing to the changed damping behavior. It is therefore made possible for the torsional damper to be exchanged before it fails, thereby causing damage, in particular irreparable damage. A predefinable tolerance range for an amplitude difference can be set as a function of the torsional damper used and the application in the vehicle, i.e. as a function of the internal combustion engine. Exceeding or undershooting of the tolerance range during an ongoing operation is detected as an indicator of a fault of the torsional damper. In particular fractures in the drive shaft can be avoided by prompt exchange of the torsional damper.

As a result, such a method provides a precautionary measure which is based on the evaluation of at least one engine order of the drive shaft.

In a further embodiment, a plurality of reference vibration signals are acquired as a function of a drive setpoint rotational speed. This may provide for an improved database for stored reference characteristic values of the vibration signals. This makes it possible for the diagnostic method to be applied better, in particular for a large range of relevant engine rotational speeds and, in particular, for the entire rotation speed range of the internal combustion engine, since the reference vibration signals are generally dependent on the engine rotational speed. This makes it possible to select a reference vibration signal, corresponding to a measured operating vibration signal, for a specific drive setpoint rotational speed and compare them with one another. As a result, the accuracy of the comparison of the signals and therefore the accuracy and reliability of the diagnostic method are improved overall.

In a further embodiment, a plurality of reference values for a selected drive setpoint rotational speed and a selected engine order are averaged. This may lead to increased reliability of the reference characteristic value. By averaging a plurality of reference values for a selected drive setpoint rotational speed a relatively high level of statistical reliability is achieved. In this context, the averaging of the reference values can take place either in the time domain or in the angular domain, i.e. before a frequency analysis is carried out, or in the angle frequency domain, i.e. after frequency analysis has been carried out.

In a further embodiment, the determination of the reference vibration signal accounts for a trend compensation. This may simplify the acquisition of the reference vibration signal and of the operating vibration signal since the condition of a steady-state rotational speed for the acquisition of the vibration signal does not necessarily have to be complied with. This would therefore be problematical since a steady-state rotational speed is frequently maintained only in signal sections of limited length since, for example owing to air resistance, a falling or rising carriageway or as a result of similar external influences the drive rotational speed is not in a steady state. In the case of planned acquisition of, for example, twenty successive steady-state reference vibration signals, the acquisition of such a cycle can be time-consuming and therefore costly. By taking into account a trend compensation it is possible to acquire the vibration signals with high accuracy even then by carrying out the frequency analysis on the basis of a quasi-steady-state signal which is generated by compensating the measurement signal trend in a digital measurement signal. This makes it possible to compensate falling or rising rotational speed trends. Determining and compensating the measurement signal trend make it possible to carry out the frequency analysis independently of whether the actual measurement signal is in the steady state or non-steady state. Correspondingly, the frequency analysis can be carried out in any desired state of the internal combustion engine without the accuracy of the acquired information being adversely affected hereby. The trend compensation can be carried out, for example, by eliminating a disruptive basic tendency in the measurement signal, with the result that the basic tendency no longer adversely affects the frequency analysis. Trends are removed from a resulting quasi-steadystate signal, wherein a possibly remaining non-steady-state profile owing to inaccuracies during the compensation of the measurement signal trend can be separated with the result that the information acquired by means of the frequency analysis does not significantly adversely affect the accuracy thereof.

In a further embodiment, the torsional damper is arranged at a free end of the drive shaft. This may allow the torsional vibrations of the drive shaft on the arrangement of the torsional damper on the drive shaft to be damped particularly effectively. At a free end of the drive shaft, comparatively large amplitudes of a torsional vibration can occur. As a result of the arrangement of the torsional damper at the free end of the drive shaft, these vibration amplitudes are particularly effectively damped. Correspondingly, changes in the damping behavior of the torsional damper have a particularly clear effect on the vibration behavior of the drive shaft.

In a further embodiment, the acquisition of at least one of the vibration signals is performed in an overrun mode. This may permit acquisition of a reference vibration signal which is substantially decoupled from influences of individual cylinders.

As a result of the fact that a drive is not energized in an overrun mode, influences of a cylinder-dependent injection behavior on the rotational speed signal can be excluded. In the overrun mode, influences of the drive shaft mechanics can be substantially seen in the rotational speed signal. Alternatively, it is also possible to apply the method to an energized operating mode, in which case it should be ensured that the injection behavior does not degrade the acquired signals.

In a further embodiment, torsional vibrations of the drive shaft are compensated using a flywheel mounted at a fixed end of the drive shaft as an energy accumulator. This may permit rotational vibrations between the drive and the clutch in the drive shaft to be reduced.

Figure 2:
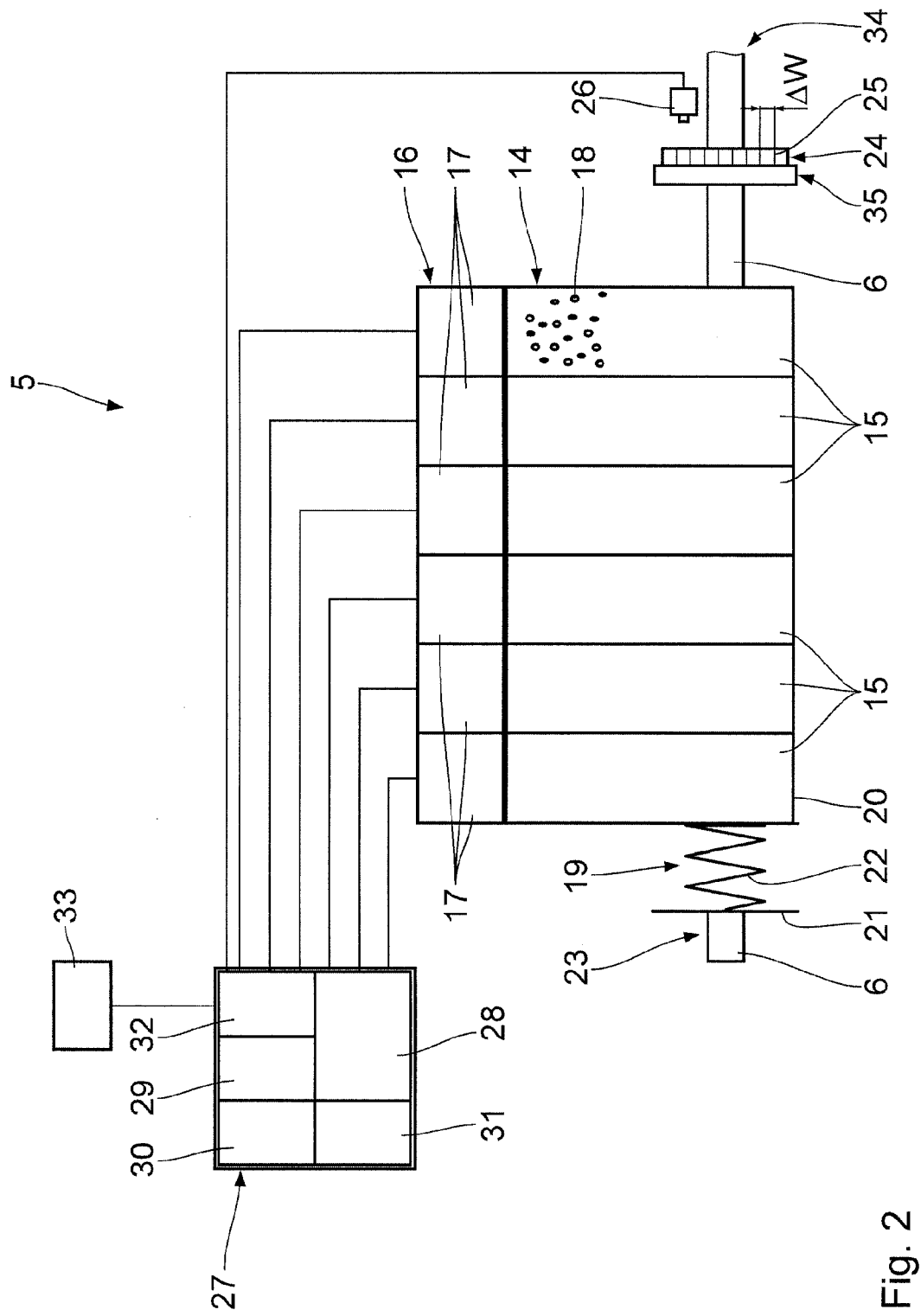
FIG. 2 shows an enlarged basic illustration of an internal combustion engine according to FIG. 1.

In the text which follows, a drive train 1 of a motor vehicle for carrying out the disclosed diagnostic method is explained in more detail with reference to FIGS. 1 and 2. The drive train 1 has a clutch 2 which divides the drive train 1 into a drive side 3 and an output side 4. The drive side 3 comprises a drive 5 in the form of an internal combustion engine which is connected to a drive-side first clutch element 7 via a drive shaft 6 in the form of a crank shaft.

On the output side 4, the drive train 1 comprises an output-side second clutch element 8 which is connected to a differential 11 via an output shaft 9 and a transmission 10 integrated therein. The differential 11 is in turn connected to drive gears 13 via gear shafts 12.

The clutch elements 7 and 8 can be displaced relative to one another, with the result that in an open state of the clutch 2 they do not bear against one another, and in a closed state of the clutch 2 they do bear against one another, as a result of which a torque can be transmitted from the drive side 3 to the output side 4 by means of the clutch 2. The clutch elements 7, may be embodied as clutch plates or plate packets. For applying the first clutch element 7 to the second clutch element 8 it is possible to provide a clutch actuator (not illustrated) which is of hydraulic design and can be activated by means of a fluid in the form of oil. The clutch actuator may comprise a piston-cylinder unit with a cylinder and a piston guided therein. In this context, the piston can act on the first clutch element 7, wherein the cylinder can form a pressure space which is bounded on one side by the axially displaceable piston. Alternatively, the clutch 2 can also be activated by electric motor.

The internal combustion engine 5 has an engine block 14 with a plurality of cylinders 15 and an injection system 16. The injection system 16 comprises, for each cylinder 15, an injection unit 17 for injecting fuel 18. As is shown in FIG. 2, the internal combustion engine 5 has six cylinders 15, with the result that a cylinder number Z=6. The internal combustion engine 5 can be either a self-igniting or a non-self-igniting internal combustion engine 5. The crank shaft 6 is arranged inside the engine block 14 and is led out of it on both sides. In order to convert the energy of the fuel 18 which is released in the cylinders 15 into a rotational movement, the crank shaft 6 is connected to cylinder pistons (not illustrated in more detail).

At a free end 23 of the crank shaft 6 which is led out of the engine block 14, a torsional damper 19 is provided. The torsional damper 19 serves to damp torsional vibration energy of the crank shaft 6 owing to an impact-like transmission of force from the cylinder pistons to the crank shaft 6, briefly resulting in torque peaks which can lead to the generation of noise and wear, for example in the transmission 10. The torsional vibrations additionally twist the crank shaft 6, with the result that torsional fractures of the crank shaft 6 can occur owing, in particular, to continuous loading. The torsional damper 19 is embodied as what is referred to as a viscosity damper, wherein other designs of a torsional damper can also be monitored with the disclosed diagnostic method. The torsional damper 19 comprises a fixed primary mass which is formed by a housing 20 of the engine block 14. Furthermore, a secondary mass in the form of a fly ring 21 is provided. A spring element 22 is provided between the fly ring 21 and the housing 20 and couples the housing 20 to the fly ring 21. The spring element 22 is embodied as an elastomer such as, for example, natural rubber or rubber, wherein other materials with good damping properties can alternatively be used, such as, for example, silicone, oil or a spring element as, a screw disk spring. The free end 23 of the crank shaft 6 is permanently connected to the fly ring 21 on a side lying opposite the spring element 22.

A sensor wheel 24 for measuring a rotational speed of the crank shaft 6 is provided at an end 34 of the crank shaft 6 arranged opposite the free end 23. The end 34 is also referred to as a fixed end since it is permanently connected to the output shaft 9 and the transmission 10 via the clutch 2. In contrast to the free end 23, the fixed end 34 cannot vibrate freely.

The sensor wheel 24 has equidistant angle marks 25 for the purpose of determining a rotational speed signal N, corresponding to the rotational speed, of the crank shaft 6. The angle marks 25 have a mark distance $\Delta W$ which corresponds to, for example, 6° or 10° rotation of the crank shaft. The angle marks 25 can be embodied, for example, by holes or teeth. A sensor, for example, an inductive sensor 26 which is suitable for detecting the markings 25 on the sensor wheel 24 is provided adjacent to the sensor wheel 24. The use of the sensor wheel 24 for determining the rotational speed signal N permits, on the one hand, a particularly robust and effective determination of the measurement signal and, on the other hand, uncomplicated and therefore cost-effective provision of the rotational speed signal N since the sensor wheel 24 is provided in any case on the drive train 1 for the determination of the rotational speed for an engine controller. Additional components and assemblies for determining the rotational speed of the crank shaft 6 are therefore not necessary to carry out the method.

The sensor 26 and the injection units 17 have a signal-transmitting connection to a control unit 27 for determining the rotational speed signal N of the crank shaft 6 and for controlling the internal combustion engine 5. The control unit 27 comprises a signal sampling unit 28, a signal preprocessing unit 29, a transformation unit 30 and a regulating and detecting unit 31. The control unit 27 also has a comparison and evaluation unit 32 which has a signal-transmitting connection to a display unit 33.

A flywheel 35 as an energy store is also provided at the fixed end 34 of the crank shaft 6, that is to say on a side of the internal combustion engine 5 facing away from the torsional damper 19. The flywheel 35 serves to compensate fluctuations in rotational speed in the crank shaft 6 in order, in particular, to improve smooth running of the crank shaft 6. The flywheel 35 is capable of picking up peaks in rotational speed which can occur between two flywheel masses which are connected to one another by damping elements such as, for example, helical springs and/or gearwheels. The flywheel 35 which is illustrated schematically in FIGS. 1 and 2 is embodied as a two-mass flywheel, that is to say divided in two. In this context, a first part is connected to the internal combustion engine 5 via the crank shaft 6. A second part is connected via the crank shaft 6 to the clutch 2 and therefore to the transmission 10. The second part permits avoidance of resonances in the transmission 10 and in the section of the crank shaft 6 between the flywheel 35 and the clutch 2.

As a result of the fact that the sensor wheel 24 is arranged directly on the second part of the two-mass flywheel 35 and is connected in a rotationally fixed fashion thereto, the rotational speed signal N which is determined with the sensor wheel 24 is subjected to lower process fluctuations than, for example, an unfiltered rotational speed signal N which is subject to fluctuations in rotational speed. The flywheel 35 is also suitable for outputting energy stored in the spring elements to the crank shaft 6 at low rotational speeds, and of therefore contributing to improving the constancy of the rotational speed signal N. Arranging the sensor wheel 24 together with the flywheel 35 at the fixed end 34 of the crank shaft 6 improves the acquisition of the rotational speed signal N.

In the text which follows, the diagnostic method for the torsional damper 19 is explained in detail. The detection signals, determined by the sensor 26, of the angle marks 25 are transmitted to the signal sampling unit 28. During operation of the internal combustion engine 1, the times between the detected angle marks 28 of the sensor wheel 24 are continuously converted by means of the signal sampling unit 28 into the digital rotational speed signal N of the crank shaft 6. The rotational speed signal N is subsequently fed to the signal preprocessing unit 29 in which mechanical fabrication tolerances of the sensor wheel 24 are corrected by means of stored correction values. Mechanical fabrication tolerances are, for example, non-equidistant distances between the angle marks 25. As a result of the fact that the angle marks 25 are arranged, for example, with 6° or 10° rotation of the crank shaft at the sensor wheel 24, the rotational speed signal N is discrete and has sampling values at intervals of 6° or 10° rotation of the crank shaft. Sensor wheels with any desired number of angle marks 25 are also conceivable, wherein the number of angle marks should be selected such that the sample theorem is met, i.e. that the following applies:

$$f_s > 2 \cdot BW,$$

wherein $f_s$ is the sampling frequency and BW is the bandwidth of the measurement signal. In order to generate a quasi-steady-state signal N' from the rotational speed signal N, the latter can be fed to a trend compensation unit (not illustrated) which is arranged in the control unit 27. The trend compensation unit serves to determine a measurement signal trend of the rotational speed signal N. The rotational speed signal N can have, for example, after an initially steady-state behavior, a non-steady-state falling behavior. The measurement signal trend is approximated in the trend compensation unit by a regression polynomial of the first order, that is to say a straight line. For this purpose, an evaluation window is considered which is shifted incrementally by one increment. The start of the respective evaluation window corresponds to the start of a respectively associated working cycle, wherein the increment and an evaluation window length of the evaluation window correspond to precisely one working cycle. A working cycle of the internal combustion engine 5 corresponds to 720° rotation of the crank shaft. Correspondingly, the rotational speed signal N is approximated in each working cycle by a regression polynomial.

By compensating the measurement signal trend, which is characterized by the regression polynomial, the quasi-steady-state signal N' is generated from the rotational speed signal N.

In order to generate the quasi-steady-state signal N', a difference is formed between the rotational speed signal N and the regression polynomial. The difference formation takes place by means of such a signal length that an analysis window for the subsequent frequency analysis is filled with the steady-state signal N'. The analysis window can have an analysis window length of three working cycles, and is therefore greater than the evaluation window length.

In order to carry out the disclosed diagnostic method for the torsional damper 19, the internal combustion engine 5 is first operated in a reference state, wherein a steady-state reference rotational speed signal $N_{ref}$ or a quasi-steady-state reference rotational speed signal $N'_{ref}$ which is obtained by trend compensation is acquired, as described above. Purely for reasons of clarity, the further method will be explained exclusively with reference to the steady-state reference rotational speed signal $N_{ref}$, referred to for short as reference rotational speed signal $N_{ref}$. However, the method can also be correspondingly applied to the quasi-steady-state reference rotational speed signal $N'_{ref}$. The acquisition of the reference rotational speed signal $N_{ref}$ may take place in a new state of the crank shaft 6, since then the vibration behavior of the crank shaft 6 is unfalsified. The reference rotational speed signal $N_{ref}$ is subsequently transformed into the frequency range, wherein if necessary a trend compensation can take place.

The acquisition of the reference rotational speed signal $N_{ref}$ may take place in the overrun mode of the internal combustion engine 5, i.e. no firing of the internal combustion engine 5 takes place. This ensures that influences of individual cylinders which can have a different injection behavior on the rotational speed signal are excluded. In the overrun mode, essentially only influences of the crank shaft mechanics are apparent in the reference rotational speed signal $N_{ref}$.

Figure 3:
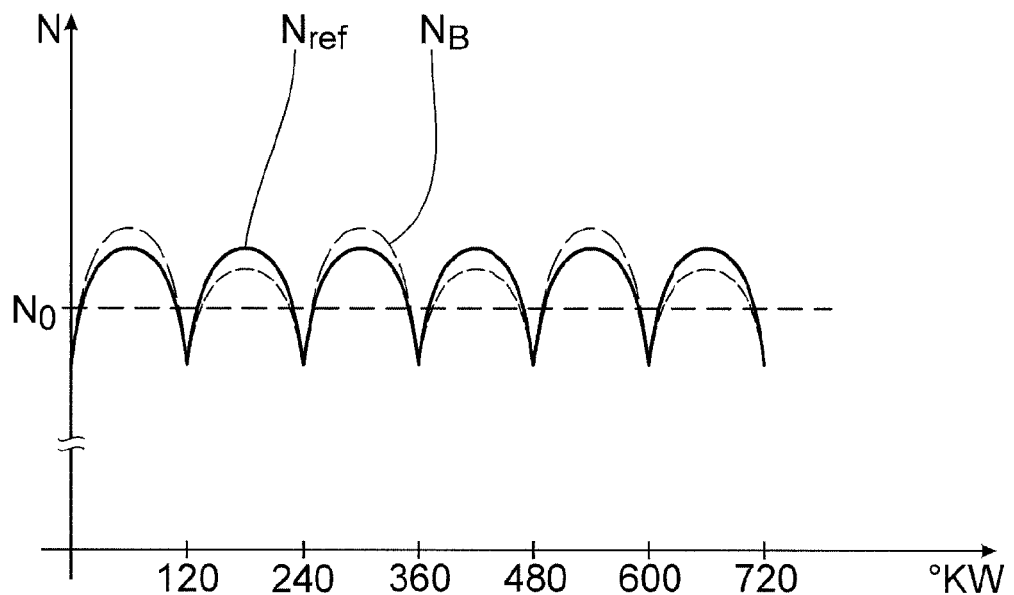
FIG. 3 shows a schematic illustration of a reference vibration signal and of an operating vibration signal in an angular range.

In FIG. 3, the reference rotational speed signal $N_{ref}$ (unbroken line) and an operating rotational speed signal $N_B$ (dashed line) are illustrated schematically in the time domain and/or angular domain as a function of the rotation of the crank shaft.

On the basis of a common DC component of the rotational speed signals $N_{ref}$, $N_B$, characterized by a constant engine rotational speed $N_0$, the wave crests indicate the deflections of the six cylinders of the internal combustion engine 5. The wave crests of the operating rotational speed signal $N_B$ are higher than those of the reference rotational speed signal $N_{ref}$, i.e. the damping of the torsional vibrations by the torsional damper 19 is reduced in the operating state starting from the reference state. FIG. 3 also indicates the fact that a working cycle of the internal combustion engine 5 corresponds to 720° rotation of the crank shaft.

The rotational speed signals $N_{ref}$, $N_B$ are subsequently fed to the transformation unit 30 and transformed into an angle frequency range. The transformation takes place, for example, by means of a discrete Fourier transformation (DFT). Alternatively, the transformation can also be carried out by means of a discrete Hartley transformation (DHT). Compared to DFT, DHT provides the advantage that calculation can be carried out exclusively by means of real operations. The transformation results in each case in a frequency spectrum of the rotational speed signals $N_{ref}$, $N_B$ which are fed to the regulating and detecting unit 31. In the latter, a frequency analysis of the corresponding frequency spectrum is subsequently performed in each case, wherein precise information about the rotational speed behavior of the crank shaft 6 and therefore about the damping behavior of the torsional damper 19 are acquired. By means of the frequency analysis, in particular the DFT or the DHT, the rotational speed signal of the crank shaft 6 can be analyzed, and an engine order, in particular the $1.5^{th}$ engine order in the case of a series-mounted six cylinder motor, can be extracted.

Figure 4:
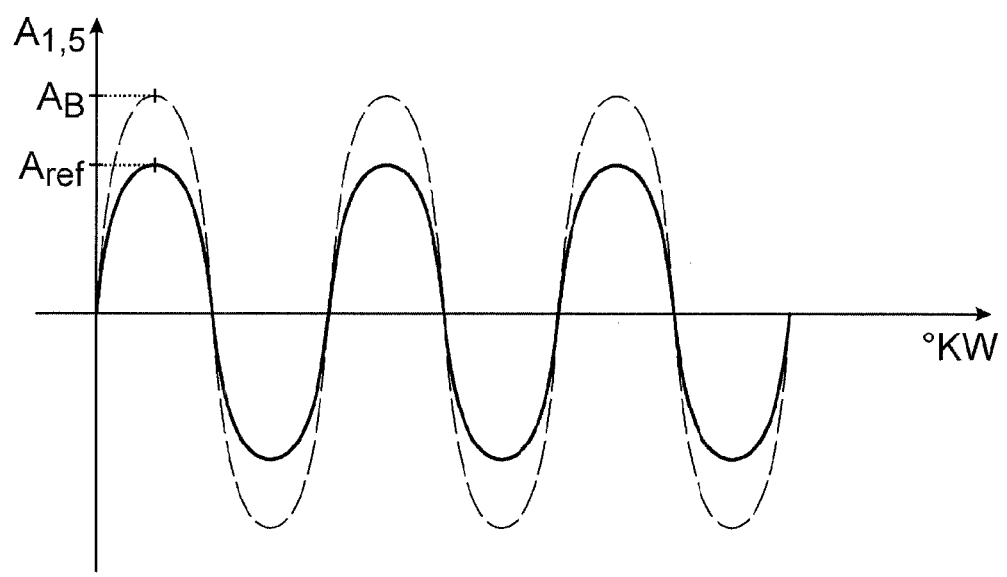
FIG. 4 shows a profile of the $1.5^{th}$ engine order of the vibration signals according to FIG. 3 in an angular range.

The amplitudes $A_{ref}$, $A_B$ of the $1.5^{th}$ engine order of the transformed rotational speed signals $N_{ref}$, $N_B$ are illustrated in FIG. 4 as a function of the rotation of the crank shaft. The respective amplitude value $A_{ref}$, $A_B$ is obtained directly from the DFT or the DHT.

The transformed rotational speed signals $N_{ref}$, $N_B$ are subsequently transmitted to the comparison and evaluation unit for extracting the amplitude values $A_{ref}$, $A_B$. Initially, a comparison of the two amplitude values $A_{ref}$, $A_B$ of the $1.5^{th}$ engine order is carried out, which comparison is represented by an amplitude difference $\Delta A$ by means of a difference former, where the following applies:

$$\Delta A = A_{ref} - A_B.$$

Figure 5:
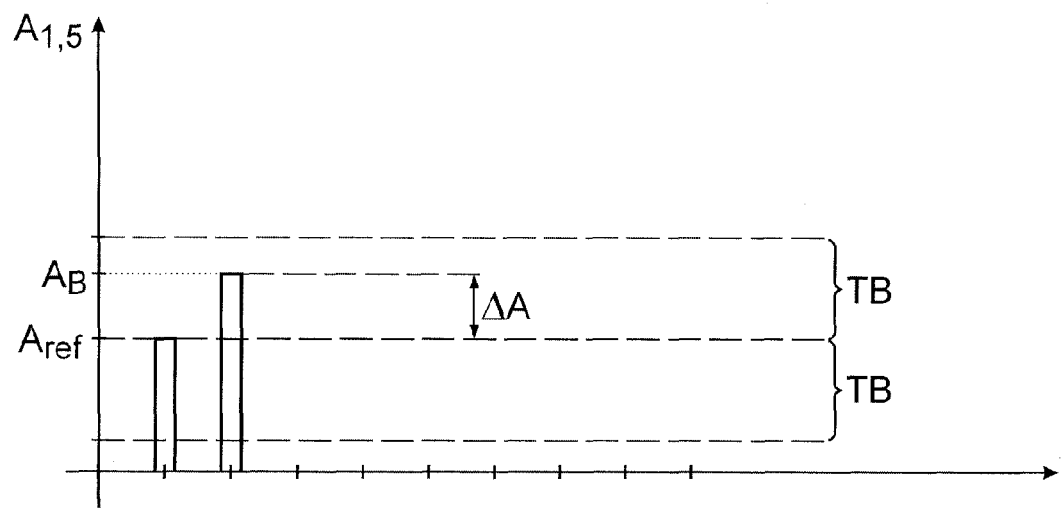
FIG. 5 shows extracted amplitude values of the $1.5^{th}$ engine order with an amplitude difference calculated therefrom and a tolerance range for the amplitude difference.

The comparison of the amplitudes $A_{ref}$, $A_B$ can also take place elsewhere, for example by quotient formation or other methods known from the field of signal evaluation. The amplitude difference $\Delta A$ resulting from the comparison of the amplitudes $A_{ref}$, $A_B$ is illustrated in FIG. 5 together with a predefined adjustable tolerance range TB. The tolerance range according to FIG. 5 is arranged symmetrically with respect to the reference amplitude $A_{ref}$, with the result that according to the embodiment shown an operating amplitude $A_B$ which is either increased or reduced with respect to the reference amplitude $A_{ref}$ can basically lie within the tolerance range TB. Depending on an application case it is also conceivable to provide the tolerance range TB only above or only below the reference amplitude $A_{ref}$. According to FIG. 5, the amplitude difference $\Delta A$ is located within the tolerance range.

As soon as the amplitude difference $\Delta A$ exits the predefined tolerance range TB, the comparison and evaluation unit 32 gives rise to an alarm signal which is transmitted to the display unit 33. The display unit 33 may be embodied, for example in the form of a control lamp in the dashboard of the motor vehicle. It is also conceivable for a corresponding entry to be stored in a fault memory of the motor vehicle with the result that this entry, for example, is recorded on an engine test bench during routine checking of the motor vehicle. This entry in the fault memory can be made dependent, for example, on the time period in which checking of the fault memory is to be expected, i.e. when the next checking of the motor vehicle will be carried out. It is also conceivable to configure the tolerance range TB in, for example, two stages in such a way that an internal tolerance range and an external tolerance range, which is larger than the internal tolerance range, are defined. Insofar as the amplitude difference $\Delta A$ is located within the internal tolerance range, there is no alarm signal issued by the control unit 27 to the display unit 33. Insofar as the amplitude difference $\Delta A$ exits the internal tolerance range and is located within the external tolerance range, an alarm signal in the form of a warning is transmitted to the display unit 33, with the result that an operator is warned that the torsional damper 19 could fail in the near future and damage could result from this. In a second stage, a stop signal could be transmitted as an alarm signal to the display unit 33 if the amplitude difference $\Delta A$ exits the external tolerance range. In such a case, the operator is unmistakably informed that if the internal combustion engine 5 continues to operate, damage must be expected immediately to the torsion vibration damper 19 and therefore to the crank shaft 6.

Since the rotational speed signals $N_{ref}$, $N_B$ and therefore also the associated amplitude values are dependent on rotational speed, it is advantageous to analyze a plurality of reference vibration signals $N_{ref}$ as a function of the drive setpoint rotational speed $N_0$.

Since, as is the case per se with any measuring task, statistical fluctuations continue to give rise to measuring uncertainty, it is advantageous to acquire a plurality of reference vibration signals $N_{ref,i}$ for each of the selected drive setpoint rotational speeds $N_{0,i}$, and to average them or to extract a plurality of reference amplitudes $A_{ref,i}$ therefrom and average them. The index i characterizes a counting index for the various drive setpoint rotational speeds $N_{0,i}$, for example $N_{0,1} = 600$ l/min, $N_{0,2} = 1500$ l/min, $N_{0,3} = 2500$ l/min etc. The reference amplitudes $A_{ref,i}$ can therefore subsequently be combined to form an amplitude mean value $A_m$ such as, for example, the arithmetic mean value.

Figure 6:
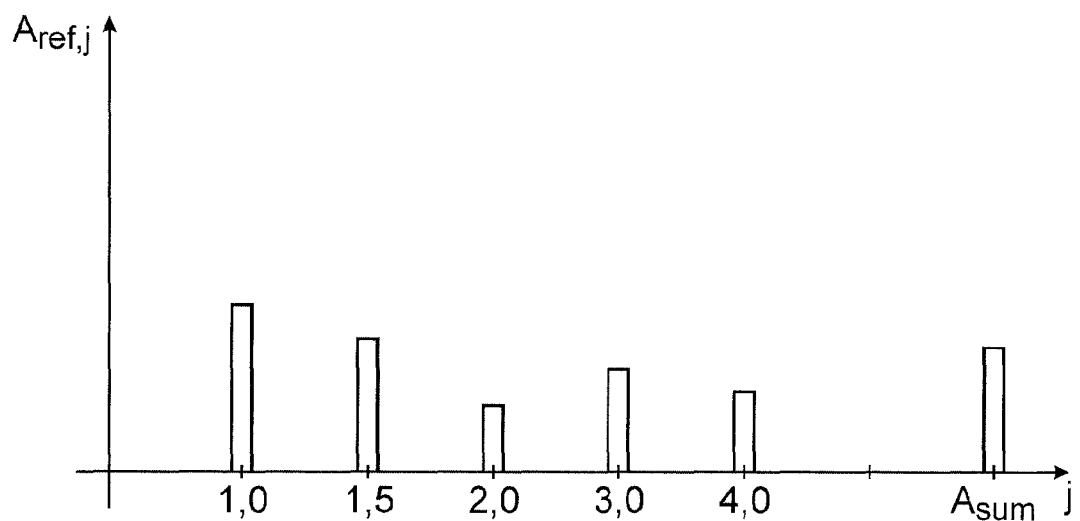
FIG. 6 shows extracted amplitude values of various engine orders with a weighted amplitude sum value calculated therefrom.

As stated above, the $1.5^{th}$ order has proven particularly suitable, for example in the case of a series-mounted six cylinder engine, for detecting changes in the vibration behavior of the crank shaft 6 and therefore in the damping behavior of the torsional damper 19 since these orders react particularly sensitively to changes in the mechanic damping properties of the torsional damper 19. Damage to the torsional damper 19 and, in particular, to the spring element 22 gives rise to a changed vibration characteristic of the torsional damper 19, resulting in a changed vibration signal. Under certain circumstances it may therefore be appropriate to detect various engine orders and to extract their reference amplitudes $A_{ref,j}$, wherein the index j characterizes the respective engine order. The extracted reference amplitudes $A_{ref,j}$ can, as illustrated in FIG. 6, be combined to form an, in particular weighted, amplitude sum value $A_{sum}$ according to $$A_{sum} = \Sigma(A_{ref,j} \cdot k_j),$$

where $k_j$ is a weighting factor which is associated with a reference amplitude $A_{ref,j}$ of a specific engine order.

What is claimed is:

1. A computer-implemented diagnostic method for a torsional damper in a drive train of a vehicle, comprising:
    providing a drive train comprising:
        a drive for generating a drive torque,
        a drive shaft coupled to the drive and configured to transmit the drive torque to an output shaft, and
        a torsional damper connected to the drive shaft and configured for damping torsional vibrations of the drive shaft,
    a processor acquiring a reference vibration signal of the drive shaft in a reference state,
    the processor acquiring an operating vibration signal of the drive shaft in an operating state that deviates from the reference state,
    the processor calculating a reference amplitude of the reference vibration signal and an operating amplitude of the operating vibration signal, the processor comparing the amplitude of the reference vibration signal with the amplitude of the operating vibration signal to determine an amplitude difference, the processor comparing the amplitude difference to a predefined tolerance range, and the processor issuing a warning in response determining that the amplitude difference falls outside the predefined tolerance range.

2. The method of claim 1, wherein the vibration signals are the rotational speed signals of the drive shaft.

3. The method of claim 1, wherein calculating the reference amplitude of the reference vibration signal and the operating amplitude of the operating vibration signal comprises, for each of the reference vibration signal and the operating vibration signal, transforming the respective vibration signal into a frequency range and extracting a respective amplitude of at least one engine order of the drive shaft.

4. The method of claim 3, comprising comparing the amplitudes of the extracted engine order.

5. The method of claim 4, comprising calculating a weighted amplitude sum value of various extracted engine orders as a reference amplitude value.

6. The method of claim 1, comprising assigning a new state of the drive shaft as a reference state.

7. The method of claim 1, comprising determining a plurality of reference vibration signals as a function of a drive setpoint rotational speed.

8. The method of claim 1, comprising averaging a plurality of reference values for a selected drive setpoint rotational speed and a selected engine order.

9. The method of claim 8, comprising accounting for a trend compensation in the determination of the reference vibration signal.

10. The method of claim 1, comprising arranging the torsional damper at a free end of the drive shaft.

11. The method of claim 1, comprising performing the acquisition of at least one of the vibration signals in an overrun mode.

12. The method of claim 1, comprising compensating torsional vibrations of the drive shaft using a flywheel mounted at a fixed end of the drive shaft as an energy accumulator.

* * * * *